Patented Apr. 15, 1952

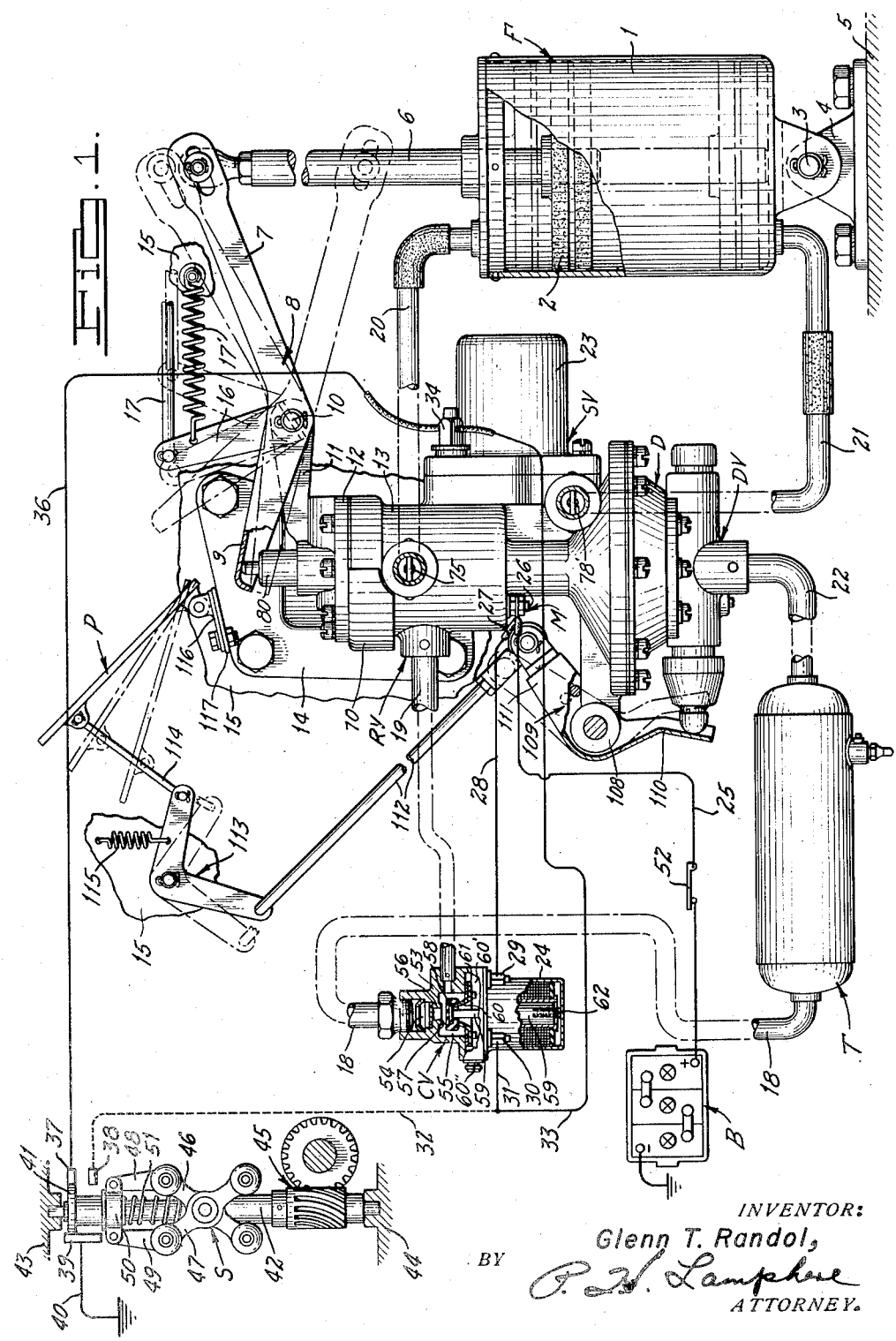

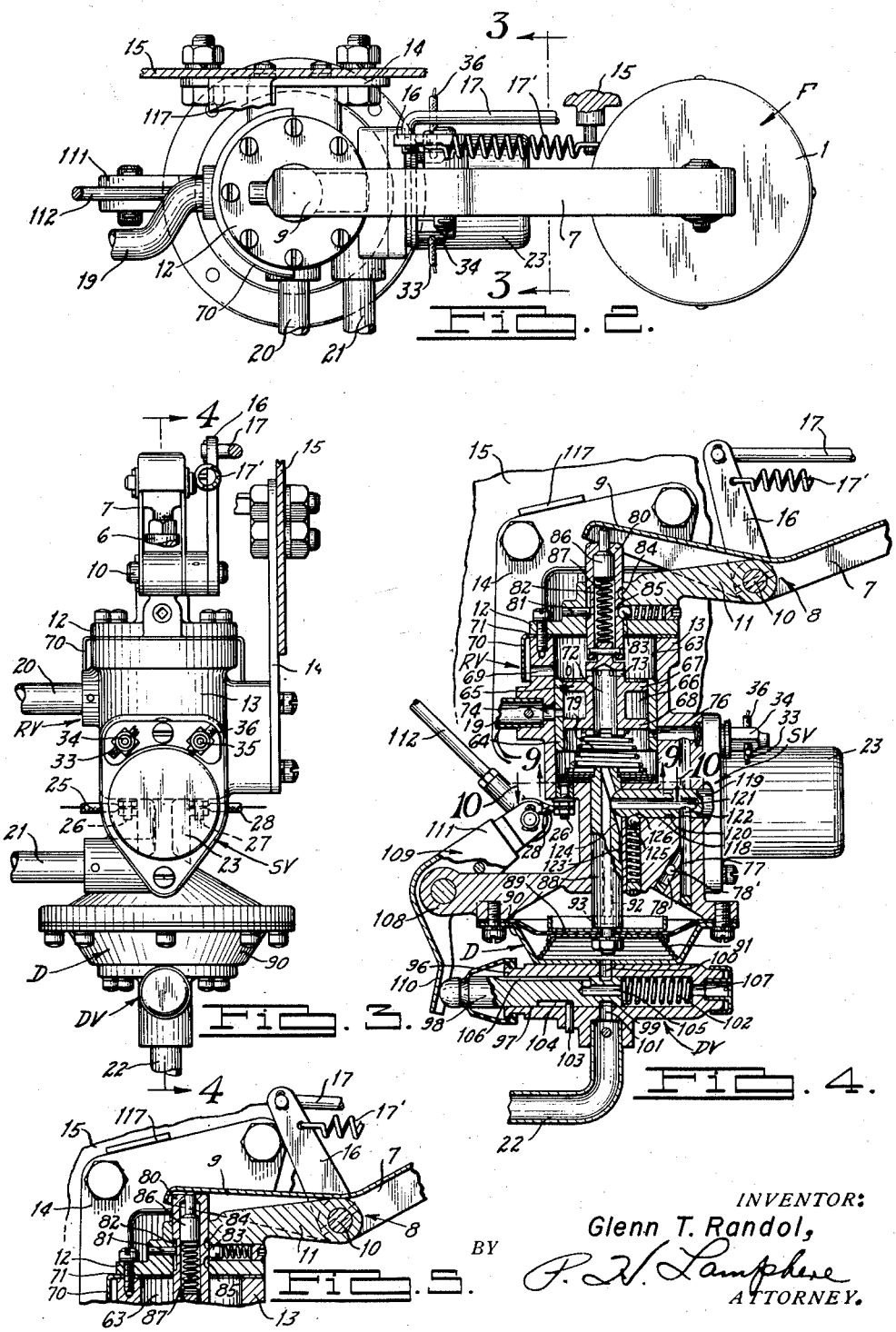

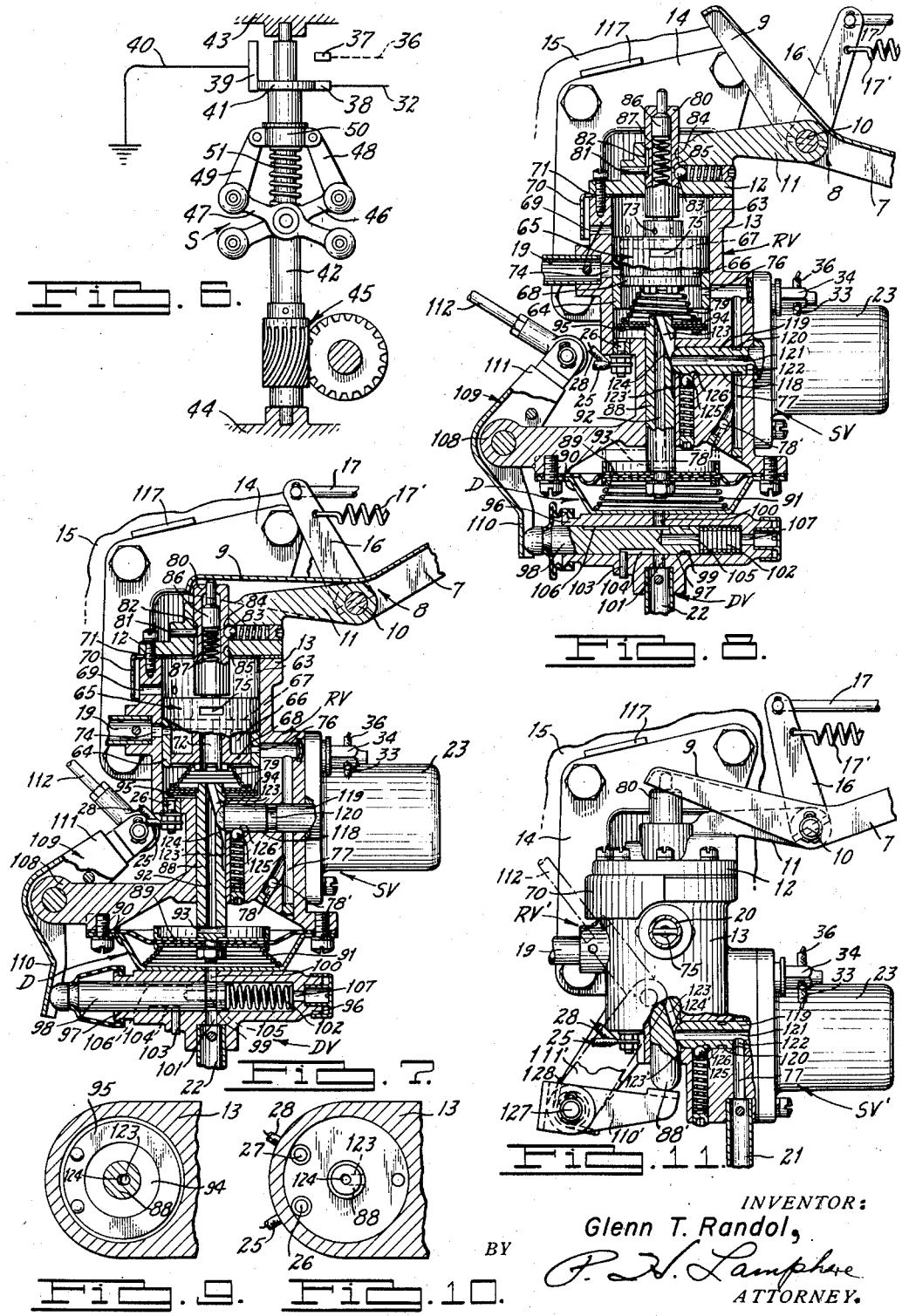

2,592,600

UNITED STATES PATENT OFFICE 2,592,600

FLUID-ACTUATED SERVOMOTOR CONTROL VALVE SYSTEM

Glenn T. Randol, Fort Lauderdale, Fla.

Application June 9, 1947, Serial No. 753,545

19 Claims. (Cl. 121—38)

1

This invention relates to control valve systems for fluid-actuated servomotors, and more particularly to control valving for causing the movable element of a fluid pressure actuated servomotor to move from one position to another and automatically reverse itself and return to its initial position, all under the action of differential or motive fluid pressure.

One of the primary objects of my invention is to produce an improved reversing valve mechanism for use in controlling the movement of the movable element of a fluid-actuated servomotor from one position to another and return.

Another salient object is the provision of an improved reversing valve means and control means therefor which is capable of so controlling the movable element of an associated fluid motor power means, that a one-way stroke of the movable element can be obtained, followed by a two-way stroke and vice versa, depending upon certain conditions.

A further important object is to provide an improved reversing valve means and control means therefor for association with a fluid servomotor whereby controlled automatic reversing movement of the element of the servomotor can be prevented, notwithstanding the reversing valve means has been set to cause the movable element to reverse automatically.

Another important object of the invention is to associate with a fluid servomotor an improved reversing valve means and controls therefor whereby, under certain conditions, a single movement of the servomotor movable element will result, while under other conditions a reciprocable movement of said element will result.

A further object is to produce a reversing valve means for association with a piston-type servomotor which can be controlled by a speed-responsive device.

A still further object is to provide a reversing valve means for association with a fluid servomotor and so control said valve means by a personally-operable member that the movable element of the servomotor can, under the action of differential fluid pressure, be caused to move from one position to another and automatically return to the initial position and following said functioning the valve means can be reset so that the cycle can be repeated at will.

A further object is to produce an improved reversing valve mechanism and control means therefor.

Another object is to so associate with a reversing valve means improved shut-off valve

2 means and control means for both valve means whereby the movable element of a fluid servomotor can be caused to move in one direction, to have a return movement or to have a reciprocable movement.

A further object is to provide improved means for resetting a reversing valve means so that it can again function to cause an element controlled thereby to have a reciprocable movement.

A more specific object is to provide a control means embodying a reversing valve means for a fluid servomotor which is particularly adaptable for controlling the changing of speed drives of a motor vehicle.

Other objects of the invention will become apparent from the following description taken in connection with the accompanying drawings in which:

Figure 1 is a schematic view with parts in section of a control system embodying my invention and showing a fluid servomotor, together with an associated reversing valve means and a combined personally-operable and speed-responsive control means therefor, the reversing valve means being shown in the position assumed when the personally-operable means is in its released position, the speed-responsive means is inactive to close the primary circuit and the fluid motor piston is about to complete its movement to the upper end of the cylinder remote from its normal initial position, and wherein the electrical circuits are depicted in solid and broken lines to indicate energized and non-energized conditions thereof respectively;

Figure 2 is a top view of the reversing valve means and fluid servomotor as shown in Figure 1;

Figure 3 is an end view of the reversing valve means, said view being taken on the line 3—3 of Figure 2;

Figure 4 is a vertical sectional view of the reversing valve means taken on the line 4—4 of Figure 3 and showing the parts in the position assumed when the fluid servomotor piston is in the position shown in full lines in Figure 1;

Figure 5 is a sectional view of the upper part of the reversing valve means and showing how the reversing valve element is shifted from one of its operative positions to the other by the fluid motor piston as the piston moves from its full line position shown in Figure 1 to its dashed line position at the upper end of the cylinder where its stroke is completed;

Figure 6 is a schematic view of the speed-responsive means showing the position it assumes to open the primary circuit and close the secondary circuit, and wherein said circuits are depicted energized and de-energized by solid and dashed lines respectively;

Figure 7 is a vertical sectional view of the reversing valve means similar to that of Figure 4, but showing the parts in the position wherein the reversing valve element has been shifted by the piston of the servomotor when it reaches the upper end of its cylinder and the solenoid controlled shut-off valve element is closed to prevent return movement of the piston;

Figure 8 is another vertical sectional view of the reversing valve means showing the parts in the position assumed when the reversing valve element is reset after the piston of the fluid servomotor has been caused to return to its initial position at the bottom of its cylinder;

Figures 9 and 10 are sectional views taken on the lines 9—9 and 10—10, respectively, of Figure 4 showing details of the master switch embodied in the reversing valve means; and Figure 11 is a side view, partly in section, of a modified reversing valve means wherein the manual control is mechanically connected to reset the reversing valve element and open the shut-off valve element.

Referring to the drawings in detail and first to Figure 1, there is disclosed by way of example, a control system for a double acting servomotor or power cylinder of the pneumatic type in which is embodied a reversing valve means and other associated means for controlling the servomotor. The fluid motor is generally indicated by the letter F and is shown, by way of example only, as one type of motor which can be controlled by the reversing valve means. This particular servomotor is of the piston and cylinder type, but it is obvious that other forms of servomotor, such as the diaphragm type, can be controlled. The power for operating the illustrated servomotor F is a source of differential fluid pressure and in the particular system disclosed this source is sub-atmospheric air pressure or suction. It is also contemplated that the control system can be associated with a servomotor which is adapted to be actuated by air or liquid under super-atmospheric pressure.

In Figure 1 the source of sub-atmospheric pressure is indicated by the tank T which can be connected to suction means. The reversing valve means of the control system is indicated generally by the letters RV and associated with this valve means is a shut-off valve SV. Also shown as part of the control system is a speed-responsive device S, a control valve CV interposed between the tank T and the reversing valve means, and a manual or personally-operable control element in the form of a pedal P which is arranged to control a diaphragm motor D whereby the resetting of the reversing valve means can be accomplished. The particular control system disclosed in Figure 1, by way of example, is intended to control a servomotor associated with a motor vehicle and arranged to operate the engine clutch and/or accomplish the changing of the gear ratios of the transmission thereof. With such a use the manually-controlled pedal or personally-operable P would be the accelerator pedal which is employed to vary the speed of the engine of the motor vehicle, the speed-responsive device S would be responsive to the speed of the vehicle and tank T would be connected to the suction or inlet manifold of the vehicle engine.

Numerous other uses of the control system for a servomotor appear obvious and it is not intended that the invention in any way be limited by the particular mechanism which the whole system, including the servomotor, is to be associated.

The servomotor F, as shown in Figure 1, has a cylinder 1 having mounted therein a reciprocable piston element 2. One closed end of the cylinder is pivoted by a pin 3 to a bracket 4 mounted on a suitable support 5. The piston rod 6 of the servomotor extends out of the other closed end of the cylinder and is arranged to be connected to one arm 7 of a bell crank lever 8, the other arm 9 of which is arranged to control the reversing valve means RV as will become apparent. The bell crank lever 8 has a pivot pin 10 to which it is rigidly secured, this pivot pin being mounted in an extension 11 on the cover 12 of the casing 13 of the reversing valve RV, which casing in turn is bolted by a suitable bracket 14 to a support 15. In order that the piston may actuate any suitable mechanism, such as a change-speed transmission and also a vehicle clutch mechanism if desired, the pivot pin 10 for the bell crank lever has secured thereto an arm 16 and connected to this arm is a rod 17 leading to mechanism to be actuated. In event the mechanism to be actuated is a vehicle clutch, such will be provided with an engaging spring against the bias of which the clutch will be disengaged. For purposes of this disclosure, such a spring is indicated at 17' so that it will be apparent how it will be effective on the servomotor. The spring could also be any other spring associated with a mechanism which requires power action in one direction to operate it and is returned by spring force. If the actuated rod 17 is connected only to change the gear ratios of a motor vehicle transmission, then the spring 17' and its effect on the piston of the servomotor need not be present and it may be eliminated.

The source of sub-atmospheric pressure represented by the tank T is connected by a conduit 18 to the control valve CV which is arranged to connect the tank with the servomotor F through the reversing valve means RV. The conduit 19 leads from the control valve CV to the reversing valve means RV and the reversing valve means is in turn connected to the servo cylinder 1, it being noted in Figure 1 that a conduit 20 leads from the reversing valve means to the upper end of the cylinder of the servomotor, and a conduit 21 leads from the reversing valve means to the lower end of the servomotor. The diaphragm motor D associated with the reversing valve means and employed for controlling the resetting of the reversing valve element is also connected to the tank T by a conduit 22, which conduit is arranged to be controlled by a valve DV interposed between the diaphragm motor and the conduit 22. The valve DV is arranged to be manually-controlled by the pedal P, or equivalent personally-operable member, in a manner which will be later described.

The shut-off valve SV, which is associated with the reversing valve means, is controlled by a solenoid 23 and this solenoid, together with the solenoid 24 of the control valve CV, are arranged to be connected in circuits under the control of the speed-responsive device S and a master switch generally indicated by M and embodied in the reversing valve means for control purposes. As shown in the wiring diagram of Figure 1, the source of electricity is a battery B having one terminal grounded and its other terminal connected by a conductor 25 to a terminal 26 (Figure 10) of the master switch M. The other terminal 27 of this master switch is connected by a conductor 28 to a terminal 29 of the solenoid 24 for controlling the valve CV. The other terminal 30 of the solenoid 24 is connected by a conductor 31 to parallel conductors 32 and 33. The conductor 33 is arranged to be connected to one terminal 34 of the solenoid 23 for controlling the shut-off valve SV. The other terminal 35 (Figure 3) of the solenoid 23 is connected by a conductor 36 to a primary contact 37 associated with the speed-responsive device S. Also associated with the speed-responsive device is a secondary contact 38 to which the previously referred to parallel conductor 32 is connected. Also associated with the speed responsive device is a common contact 39 which is grounded through a conductor 40.

The speed-responsive devices, as shown somewhat schematically in both Figures 1 and 6, has a movable switch member 41, slidable on a shaft 42, which shaft is journaled at its opposite ends in suitable supports 43 and 44 and arranged to be driven by a suitable gearing 45 from any driving mechanism; such as, for example, the driving wheels of a motor vehicle. The shaft 42 of the speed-responsive device has pivoted centrifuge members 46 and 47 which are connected by links 48 and 49 to the movable switch member 41 by means of a sleeve 50. A calibrated spring 51 normally holds the centrifuge members in their inner position, as shown in Figure 1, when the speed-responsive device is at rest or substantially so, that is, the rotation of the shaft 42 is not effective on the centrifuge members. When the centrifuge members are substantially at rest the movable switch member 41 will be in its upper position so as to connect the primary terminal 37 with the grounded terminal 39 and thus complete a circuit through both the solenoids 23 and 24 to energize these solenoids, provided, of course, the master switch M is closed. This circuit will be referred to as the primary circuit. When the shaft 42 is rotated sufficiently the centrifuge members will be thrown outwardly in the manner indicated in Figure 6 and thus the switch member 41 will be moved downwardly to thereby open the previously referred to primary circuit through the solenoids 23 and 24 and engage the secondary contact 38 to thus close a secondary circuit which will result in only the solenoid 24 of the control valve CV being energized, provided, of course, the master switch M is closed. It is thus seen that with the speed-responsive device controlling the primary and secondary circuits, then when the primary circuit is energized, as shown in Figure 1, both solenoids 23 and 24 of the valves SV and CV will be energized. When the solenoid 23 of the valve SV is energized, it will be in closed condition (Figures 4 and 7) and when the solenoid 24 of the valve CV is energized this valve will be in open position so that the reversing valve means will be connected to the source of sub-atmospheric pressure; that is, the disclosed tank T. The primary circuit is from the battery B through the conductor 25, the master switch M, conductor 28, the solenoid 24, conductors 31 and 33, solenoid 23, conductor 36 and back to ground by way of the primary terminal 37, movable switch member 41, terminal 39 and conductor 40. The secondary circuit is from battery B through conductor 25, master switch M, conductor 28, solenoid 24, conductors 31 and 32 and back to ground through the switch member 41 so as to connect the secondary terminal 38 of the speed-responsive device with the terminal 39 and grounded conductor 40, all as indicated in Figure 6. If desired, a manual switch 52 can be placed in the conductor 25. This switch can be the ignition switch of a motor vehicle if the control system is to be associated with such.

The control valve CV may be any type of shut-off valve which, when open, will connect the conduits 18 and 19 and when closed will prevent the conduit 18 from the tank T from communicating with the conduit 19 and connect the conduit 19 with atmosphere. As shown in Figure 1, the illustrated control valve CV has a casing 53 divided into compartments 54 and 55 by a ported partition 56 with which is associated a valve seat 57. The compartment 54 is connected to the conduit 18 and the compartment 55 is connected with the conduit 19. Associated with the valve seat 57 is a movable valve element 58 positioned in the compartment 55 and mounted on the end of the stem 59 of the reciprocable solenoid armature which is carried within the valve casing 53. Besides cooperating with the valve seat 57, the valve element 58 is also arranged to engage a valve seat 60 associated with a ported partition 61 positioned between the compartment 55 and the solenoid 24. The port in the partition leads to an air chamber 60' connected to atmosphere by a vent 60''. The stem 59 of the solenoid is arranged to be biased by a spring 62 so that the valve element will be caused to engage the seat 57 and be disengaged from seat 60 when the solenoid is de-energized and thereby prevent communication between conduits 18 and 19. Under such closed condition of the valve CV the conduit 19 will be in communication with the atmosphere, since the valve element 58 is free of seat 60. When the solenoid is energized the valve element 58 will be disengaged from seat 57 and engaged with seat 60, thus placing the conduits 18 and 19 in communication with each other and preventing any communication thereof with atmosphere.

Referring to the details of the reversing valve means RV, the shut-off valve SV and the resetting means comprising the diaphragm motor D and its control valve DV, reference is now had to Figures 2, 3, 4, 5, and 7 to 10. The previously mentioned casing 13 for the reversing valve means RV is provided with a bore 63 at its upper end, which bore is closed by the cover 12 to which the bell crank lever 8 is pivoted. The central part of this bore has press-fitted therein a sleeve 64 in which is reciprocal the reversing valve element 65 of the spool type having an annular chamber 66 formed by the flanged ends 67 and 68. The bore 63 above the valve sleeve is in constant communication with the atmosphere through a plurality of ports 69 which are protected from entry of foreign material by a semi-cylindrical guard 70 formed as a flange on the gasket 71 between the cover 12 and the casing. In order that the portion of the bore below the valve element may also be in constant communication with the atmosphere, the valve element has an axial passage 72 which communicates with ports 73 at the upper end of the valve. Thus the axial passage will be in communication with the previously mentioned atmospheric ports 69 in the valve casing.

The reversing valve element 65 has two servomotor operative positions, the upper of which is for connecting the upper end of the servomotor with a source of suction as tank T and the lower of which is to connect the lower end of the servomotor with the said source of suction. The upper position is shown in Figures 4 and 8 and the lower position in Figure 7. The annular chamber 66 of the valve element is arranged to communicate in both of its positions with the conduit 19 already referred to and which leads to the tank T by way of the control valve CV. This is accomplished by a passage 74 which extends through the valve casing and the valve sleeve. In order to connect the chamber 66 to the conduit 20 leading to the upper end of the servomotor F, there is provided in the valve sleeve and the valve casing a passage 75 communicating with the conduit 20. This passage 75 is slightly above the passage 74 so that when the valve element is in its upper position shown in Figures 4 and 8 there will be direct communication by way of the annular chamber 66 in the valve element and the upper end of the servomotor to the conduit 19 leading to the tank through the control valve CV. When the valve element 65 is in its lower position, as shown in Figure 7, the annular chamber 66 will be caused to be in communication with a passage 76, a longitudinally extending passage 77 in the casing wall and by means of an angular passage 78 and a passage 78' extending to the outside of the valve casing in communication with the previously referred to conduit 21 leading to the lower end of the servomotor. When the valve element 65 is in the position shown in Figure 7 to make the connection with the lower end of the servomotor and the conduit 19 leading to the tank T, the upper flange 67 of the valve element will be below port 75. This places the upper end of the servomotor in communication with atmosphere by way of the ports 69. When the valve element is in the upper position shown in Figures 4 and 8 wherein the upper end of the servomotor will be in communication with the conduit 19 and the tank T, the lower flange 68 of the valve element will be above the passage 76 which communicates with the lower end of the servomotor through the conduit 21, and because of the axial passage 72 through the valve element said lower end of the servomotor will also be in communication with atmosphere by way of the ports 69. If the valve CV is closed, then of course, irrespective of the position of the reversing valve element 65, both ends of the servomotor can be in communication with atmosphere for conduit 19 communicates with atmosphere through air chamber 60' and vent 60'' of valve CV.

The reversing valve element 65 is arranged to be moved to its upper position shown in Figures 4 and 8 through a spring 79 and other apparatus to be described. As already noted, the valve element, when in its upper position, will be in a position to connect the upper end of the servomotor to the tank T and thus if the control valve CV is open, suction will cause the piston 2 of the servomotor to be moved upwardly to the upper end of the cylinder, thus making a stroke which is brought about by the differential action of fluid pressure acting on opposite sides of the servo-piston. In order that the reversing valve element 65 can, under certain conditions, be automatically shifted to its lower position as shown in Figure 7 so as to cause a return movement of the piston of the servomotor from the upper end to its lower end, provision is made to shift the reversing valve element by means of the already referred to arm 9 of the bell crank lever 7 which is actuated by the servo-piston.

The valve element 65 has connected thereto a cylindrical rod 80 which extends through the cover 12 for the casing and is held from turning by means of a pin 81 carried by the cover and cooperating with a longitudinal slot 82 in the surface of the rod 80. The upper end of the rod 80 is arranged to be engaged by the arm 9 just before the piston of the servomotor reaches its extreme upper end. From this point to the end of the stroke of the piston the arm 9 will act upon the rod 80 and shift the valve element from the upper position shown in Figures 4 and 8 to the lower position shown in Figure 7. A spring pressed ball detent 83 is also carried by the cover and such cooperates with two recesses 84 and 85 for yieldably holding the valve element in its two servo-operative positions.

It is highly desirable when the reversing valve element 65 is to be shifted from its upper position to its lower position that this shifting take place very quickly so that the connections with the opposite ends of the servomotor will be quickly reversed. The rod 80 has provided therein a plunger 86 backed by a spring 87 which is preloaded. The plunger has a reduced portion extending out of the rod 80 and such portion will be first engaged by the arm 9 as the piston 2 of the servomotor, during its upward stroke, reaches the point shown in solid lines in Figure 1. Continued downward movement of the arm 9 as the piston continues its movement to the extreme upper end of the cylinder will result in the spring 87 being additionally compressed to increase its pre-loaded tension. By the additional tensioning of the spring 87, however, there will not be such a force created as will overcome the resistance offered by the ball detent 83 engaged in recess 85 so that the rod 80 will be moved. However, when the arm 9 reaches a point in its downward movement wherein it initially engages the rod 80, the ball detent 83 will be urged out of the recess 85 as shown in Figure 5. When the detent is out of the recess the compressed spring 87 will then expand and be effective to apply such a force to the rod 80 as to "snap" the reversing valve element 65 from its upper position to its lower position and thereby automatically reverse the fluid conduit connections to the servomotor so that sub-atmospheric pressure will be effective on the lower side of the piston and atmospheric pressure on the upper side of the piston. Thus it is seen that the movement of the arm 9 as the piston of the servomotor approaches its extreme upper position initiates the downward movement of the reversing valve element and the spring 87 completes the movement of the valve element to its lower position.

With the reversing valve element 65 just described and its manner of shifting in response to the movement of the piston of the servomotor, it will be seen that with the valve element in its upper position it will be possible to connect the upper end of the servomotor to the tank T and the lower end of the servomotor to atmosphere, and thereby cause the piston 2 of the servomotor to move from the lower end of its cylinder to the upper end. When the upper end is reached the valve element will be automatically shifted from its upper position to its lower position, as shown in Figure 7, thus reversing the fluid connections of the servomotor so that the upper end will be connected to atmosphere and the lower end connected to a source of sub-atmospheric pressure. By such fluid connection the differential fluid pressures acting on the servo-piston will cause the piston to again return to the lower end of its cylinder.

In order that this cycle of reciprocation or two-way movement of the servo-piston 2 may be again repeated, it will be necessary to reset the reversing valve element 65 in its upper position. To accomplish this the lower end of the casing 13 has reciprocably mounted therein a plunger 88, the lower end of which is arranged to be connected to diaphragm 89 of the previously referred to diaphragm motor D. The lower end of the casing 13 is flared and to the rim of this flared portion is bolted the cup shaped member 90 of the diaphragm motor, the diaphragm 89 being clamped between the peripheral flange of the cup shaped member and the flared portion of the casing. Between the diaphragm and the cup shaped member 90 there is interposed a coiled spring 91 which normally acts to move the diaphragm upwardly and also the plunger 88 which is operatively connected to the center of the diaphragm. The upward movement of the diaphragm under the action of spring 91 is limited by circular flanged edge of the upper diaphragm clamping cup engaging the flared portion of the valve casing. This upper cup and a similar lower cup clamp the diaphragm to the plunger 88. In order that air cannot be trapped between the diaphragm and the flared portion of the casing to prevent the spring from moving the diaphragm, the plunger has an axial passage 92 communicating with the exterior of the plunger by a cross passage 93 positioned at a point close to the diaphragm. Since the plunger 88 extends into the lower end of the bore 63 in which the valve element 65 reciprocates, it is seen that the axial passage 92 will communicate at all times with atmosphere by way of the axial passage 72 through the valve element to the air ports 69. This shouldered upper end of the plunger 88 has mounted thereon a washer 94 and the lower end of the previously referred to spring 79 is arranged to seat on this washer. The spring 91 acting on the lower end of the plunger 88 is stronger than the spring 79 and whenever the spring 91 is released to freely act upon the plunger 88 it will push plunger 88 upwardly and if the reversing valve element 65 is in its lower position, as shown in Figure 7, it can initially act through spring 79, to increase the tension of this spring, until the upper end of the plunger 88 engages the lower end of the valve element 65. The diaphragm spring 91 will now act directly on the valve element 65 for a limited intermediary distance of the travel of the plunger. The plunger, with the assistance of the spring 79, will then disengage the ball detent 83 from the upper recess 84 in the side of the rod 80 whereupon the expansion of the spring 79 will complete the resetting of the reversing valve element 65 to its upper position as shown in Figures 4 and 8. The valve element 65 is now positioned for controlling another cycle of reciprocable movement of the servomotor piston when conditions are such that it will again be actuated. The spring 79 is normally pre-loaded a certain degree when the valve element 65 is in its upper position, as shown in Figure 4, and when the valve element 65 is moved downwardly, as shown in Figure 7, the tension is increased, which tension is further supplemented when the plunger 88 is urged upwardly by the spring 91 so at the point wherein the plunger 88 engages the valve element 65 the tension of the spring 79 has reached a degree almost sufficient to snap the valve element 65 back to its upper position by overcoming the resistance offered by the ball detent 83 and recess 84. Therefore, the spring tension of spring 79 from a preloaded condition is increased by movements of both the servo-piston and the plunger.

The washer 94, besides serving as a seat for the spring 79, also serves as a movable member for making and breaking the previously referred to master switch M. As already noted, this master switch is provided with two fixed terminals 26 and 27 (Figure 10) which are mounted in suitable insulation in the casing 13 so as to be near the cylindrical wall at the bottom of the valve bore 63. The lower surface of the side of the bottom of the washer 94 carries an annular conducting ring 95 suitably insulated therefrom, shown in detail in Figure 9, and this conducting ring is arranged to contact the two fixed terminals 26 and 27 whenever the washer 94 assumes its position at the bottom of the bore 63, which position will occur whenever the diaphragm motor D is operated by differential fluid pressure. Whenever the plunger 88 and washer 94 are moved upwardly by spring 91, however, the master switch M will be opened, due to the fact that the conducting ring 95 is disengaged from the terminals 26 and 27.

The diaphragm motor control valve DV, which is employed to control the movement of the diaphragm 89 downwardly against the action of the spring 91, or to release the spring to expand to move the plunger 88 upwardly, is shown in detail in Figures 4, 7 and 8. This valve has a casing 96 secured to the bottom of the cup-shaped diaphragm motor member 90. The casing is provided with a bore 97 in which is slidable a valve element 98. This valve element 98 is provided with an annular groove 99 which can be arranged to place diametrically positioned ports 100 and 101 in communication with each other, the port 100 communicating with the chamber formed by the diaphragm and the cup-shaped member 90 and the port 101 being connected to the previously referred to conduit 22 which is in communication with the tank T. A spring 102 acts on the valve element 98 to normally bias the valve element to the position wherein the groove 99 connects the two ports, this position being determined by means of a pin 103 engaging the rear end wall of a longitudinally extending slot 104 in the valve element, all as best shown in Figures 4 and 7. The valve element 98 is also provided with an axial passage 105 which is arranged to communicate with a longitudinally extending surface groove 106. The groove and passage both communicate with atmosphere through a port 107 at the rear end of the valve casing and when the valve element is moved inwardly to shift the annular groove 99 out of communication with the two ports, the groove 106 will communicate with the port 100 and thus connect the lower chamber of the diaphragm motor with atmosphere and thereby allow the diaphragm, together with the rod 88, to be moved upwardly by the spring 91. Figure 8 shows the valve element 98 moved to its rearward position wherein suction will be cut off from the diaphragm motor and the said motor connected with atmosphere.

The valve element 98 is arranged to be shifted rearwardly by the already mentioned manually-operated member taking the form of the pedal P shown in Figure 1. To an extending portion 108 of the lower end of the casing there is pivotally mounted a bell crank lever 109, the lower arm of which is arranged to engage the forward end of the valve element 98 and the upper arm 111 of which is arranged to be connected by a rod 112 with a bell crank lever 113 which provides a connection to a rod 114 arranged to be actuated by the pedal. A spring 115 acts upon the bell crank lever 113 to normally bias the pedal to its released position, which position will cause the valve element 98 to assume its open position shown in Figures 7 and 8 wherein the diaphragm motor will be operated by differential fluid pressure as the result of being connected to the tank T. The pedal P can be pivoted on any desired point, but as shown is pivotally mounted by means of a bracket 116 to a ledge 117 on the same bracket 14 by which the reversing valve means is mounted to the support 15.

The reversing valve means is also arranged to have associated therewith the previously referred to shut-off valve SV which is actuated by the solenoid 23 in the already referred to primary circuit controllable by the speed-responsive device S. The purpose of the shut-off valve SV is to control the servomotor F so that the piston thereof will be caused to have a single stroke only from the lower end of the cylinder to the upper end, where it will remain until certain conditions are fulfilled, as will be apparent from the description of the operation. The shut-off valve means is associated with the passage 77 in the reversing valve casing, it being recalled that this passage 77 forms a part of the connection between the lower end of the servomotor and the reversing valve element. As shown in Figures 4, 7 and 8, the casing 73 is formed with a bore 118 intersecting at right angles the passage 77 and also entering the bore in which the plunger 88 is reciprocable to reset the reversing valve element. Slidable in the bore 118 is a valve element 119 in the form of a plunger. This valve element is formed as an extension of the armature of the solenoid 23. The valve element has an annular groove 120 so arranged in the valve element that when the valve element is at the extreme right-hand position, as viewed in the Figure 8 and the solenoid is de-energized, the groove will allow air to flow through the passage 77 in the same manner as if the valve element were not present. When the solenoid is energized the valve element will be moved to the left from the position shown in Figure 8 to the position shown in Figure 4 wherein the passage 77 will be blocked off so that the lower end of the fluid motor cannot be connected to the source of suction, notwithstanding the reversing valve element may be in its lowermost position. In order to place the lower end of the servomotor in communication with atmosphere when the passage 77 is blocked off by energization of the solenoid 23 and a movement of the valve element to the left from the position shown in Figure 8, the valve element is provided with an axial passage 121 and a radial passage 122 to connect the lower portion of the passage 77 with the bore in which the plunger 88 is reciprocal. To insure free communication with the bore 92 of this plunger and also with atmosphere, the upper end of the plunger is provided with an angular passage 123. The inner end of the valve element 119 is rounded with flat sides, as shown. The flat sided and rounded end always remains engaged in the angular passage 123, which terminates into a shallow surface groove 123' parallel to the axis of plunger 88, to prevent rotation of said element, thus maintaining alignment of radial passage 122 and passage 77 during sliding movement thereof. The rounded inner end is arranged to cooperate with the inner angular wall 124 of said passage 123, which inner wall provides a cam surface to push the valve element to the right from its shut off position whenever the plunger 88 is shifted upwardly under action of the spring 91. To hold the valve element in its shut-off position, there is provided a yieldable detent 125 which has a very weak spring, this detent cooperating with a recess 126 in the surface of the valve element so as to yieldably hold it in its shut-off position.

*Operation*

Referring now to the operation of the disclosed improved control system embodying reversing valve means for a servomotor, let it be assumed that the speed-responsive device S is at rest and the personally controlled member shown as the pedal P is in its normally released postion. Such conditions are shown in Figure 1 and as a result thereof it will be seen that the primary circuit will be closed (manual switch 52 having been previously closed), thereby energizing the two solenoids 23 and 24. The reason that the primary circuit will be closed and the two solenoids are energized is because the master switch M is in closed position due to the fact that with the pedal P in its fully released position and the valve DV conditioned so that the diaphragm motor D will be operated to move the plunger 88 downwardly, into the position shown in Figures 4 and 7. The reversing valve element 65 will be in its upper position as shown in Figures 4 and 8. If this valve element is not already in such upper position, it can be placed there immediately by depressing the pedal P so as to so operate the valve DV to cut off the diaphragm motor from the tank T and place the diaphragm motor in communication with atmosphere. This will release the spring 91 to expand and under its force the plunger 88 will be moved upwardly, thus aiding the spring 79 in shifting the reversing valve element 65 to its upper position. In the event the reversing valve element should be in the lower position when the primary circuit was energized, the servomotor of course would not be operated since suction would be acting on the lower end of its cylinder and the piston is already at said lower end of said cylinder. Furthermore, with the solenoid 23 energized the shut-off valve would be effective to prevent any suction from acting on the lower end of the cylinder of the servomotor. By the depressing of the pedal and then releasing it in order to cause the reversing valve element to move to its upper position, if it should be in the lower position, it will be further noted that during the shifting of the valve element upwardly as a result of the plunger 88 moving upwardly, the master switch M will be opened and, consequently, all suction will be shut off from the reversing valve means and the servomotor, due to the fact that the control valve CV will become closed as the primary circuit is broken and the solenoid 24 de-energized.

With the reversing valve element 65 in its upper position, the pedal P released and the primary circuit closed, as already assumed, then the upper end of the servomotor F will be placed in communication with the tank T and the lower end of the servomotor will be placed in communication with atmosphere. Consequently there will be a differential fluid pressure acting on the servo-piston 2 and it will be moved upwardly. When the piston 2 of the servomotor reaches the position shown in lines in Figure 1 the bell crank lever 8 will be in a position where the arm 9 thereof begins to engage the plunger 86 and as the piston continues to move upwardly it will press said plunger inwardly against the action of spring 87 until it engages the upper end of the hollow rod 80 to initiate its downward movement and release the spring 87, which is compressed, to quickly shift the reversing valve element to its lower position. This lower position of the reversing valve element will occur when the piston reaches the upper end of the cylinder of the servomotor as shown in dashed lines in Figure 1. The condition of the reversing valve means RV, the shut-off valve SV, the diaphragm motor D and its valve DV will then all be as shown in Figure 7 when the piston has reached the upper end of the cylinder of the servomotor. The piston will now remain at the upper end of the servomotor and cannot return to the lower end of the cylinder. The reason for this is that the shut-off valve SV is in closed position, due to the fact that the primary circuit is still closed and the solenoid 23 energized. Thus with the shut-off valve SV closed, it makes no difference that the control valve CV is still in open position due to the energization of the solenoid 24.

The movement of the piston from the lower end to the upper end of the cylinder of the servomotor can be employed to control any desired mechanism. Thus, for example, if the system were employed in controlling the changing of gear ratios of an automotive transmission, this movement of the piston to its upper position could be employed to disengage the friction clutch associated with the transmission and hold it to be held disengaged so that a gear ratio could be established manually by moving a gear-shift lever. With the spring 17' considered as a clutch re-engaging spring, such will be energized when the piston reaches the upper end of its cylinder. When this position of the piston is reached, the reversing valve element 65 will be moved to its lower position as already indicated. Both sides of the piston will then be connected to atmosphere, notwithstanding the closed condition of shut-off valve SV, as passages 121 and 122 in said valve are in communication with the bottom of the piston cylinder. Thus, to prevent a return of the piston by the spring 17' and thereby hold the clutch disengaged, any suitable means could be employed. If the spring 17' is not employed in the mechanism actuated by the piston when moved to the upper end of its cylinder, as would be the case when gear shifting only was to be accomplished, then of course the piston would remain at its upper end and no holding means would be necessary.

If the pedal P should now be depressed and there should be provided means for holding the piston from returning to its lower position in the cylinder under the action of the spring 17', such depressing of the pedal will release the holding means and the spring 17' can be effective to move the piston to the lower end of the cylinder, thus accommodating re-engagement of the clutch if it is considered the clutch is the mechanism actuated to disengaged position by the movement of the piston to the upper end of the cylinder.

The depressing of the pedal will also cause the diaphragm motor D to be disconnected from the tank T and the spring 91 will be effective to push the plunger 88 upwardly, thereby opening the master switch M in the primary circuit. The movement of the plunger upwardly will also open the shut-off valve SV due to the action of the cam surface 121 acting on the rounded end of the valve element 119. The shifting of the plunger 88 upwardly will reset the reversing valve element 65 to its upper position with the aid of spring 79 and during this resetting the spring 17' will be effective in moving the piston of the servomotor to its bottom position so that the valve element will be free to be reset. When the reversing valve element 65 is reset to its upper position it will not, however, cause the upper end of the cylinder to be connected to the tank T, notwithstanding that this position of the reversing valve element connects the conduit 19 with the conduit 20. Initial upward movement of the plunger 88 caused the master switch M to be opened and since this breaks the primary circuit, there will be a de-energizing of the solenoid 24 and, consequently, the control valve CV will be closed, thus insuring that the tank T will not communicate with the conduit 19.

If there should be no holding means for the piston to maintain it in its upper position, then of course the spring 17' will return the piston to the bottom of the cylinder. When the pedal P is depressed under such conditions, the reversing valve element 65 will be reset in its upper position. If the spring 17' should not be present, then of course the depressing of the pedal P will not result in any resetting of the reversing valve element 65 to its upper position because this resetting is prevented by the fact that the piston 2 of the servomotor will remain in its upper position and thereby hold the reversing valve element in its lower position. The depressing of the pedal P will also not have any effect in connecting the tank T to the lower end of the power cylinder so as to cause a downward movement of the piston. It will be noted that as soon as the plunger 88 is moved upwardly as a result of the depressing of the pedal P and a connecting of the diaphragm motor D to the tank, the master switch M will be opened and thus the primary circuit will be broken. Consequently solenoids 23 and 24 will be de-energized and the de-energizing of solenoid 24 will immediately cause the control valve CV to be closed and thus, notwithstanding the fact that the upward movement of the plunger 88 will open shut-off valve SV, there nevertheless can be no fluid connection between the lower end of the servomotor and the tank, due to the prior closing of the control valve CV.

If the pedal P should be an accelerator pedal associated with the engine of a motor vehicle, the derpressing of such pedal will speed up the engine and with the vehicle in gear said vehicle will move forwardly. As the vehicle moves, the speed-responsive device S will be operated and the centrifuge members moved outwardly so as to open the primary circuit and close the secondary circuit, a condition shown in Figure 6. With the secondary contact 38 now connected to ground by the movable switch element 41 of the speed-responsive device, it will be possible to close the secondary circuit whenever the master switch M is closed. This can be accomplished by merely releasing the pedal P again. Upon full release of the pedal the diaphragm motor will be connected to the tank and thereby caused to be operated, which will pull the diaphragm 89 downwardly so that the master switch M will be closed. Upon closing of the master switch and the secondary circuit the solenoid 24 will be energized, thereby opening the control valve CV which will then connect the tank to the conduit 19.

With the conduit 19 connected to the tank T, then if the piston of the servomotor is at the bottom of its cylinder, a condition existing when the spring 17' is effective on the piston, and the reversing valve element 65 is in its upper position as shown in Figure 8 (having been placed there as the result of the depressing of the pedal previous to its release), the conduit 19 will be in communication with the upper end of the cylinder of the servomotor. The valve element 119 of the shut-off valve SV will be in its open position, having been placed there by the resetting of the reversing valve element 65 to its upper position. It will remain in this open position since the solenoid 23 is deenergized, not being in the secondary circuit. With the upper end of the servo-cylinder now connected to the tank and the lower end of the servo-cylinder in communication with atmosphere, differential fluid pressure will be effective on the piston and consequently the piston will be moved to its upper position. As the piston reaches its upper position the reversing valve element 65 will be operated by the arm 9 actuated by the piston 2 and be shifted to the lower position in the manner already described. This will immediately reverse the direction of the differential fluid pressure acting on the piston 2 and consequently the piston of the servomotor will be moved back to its lower position. Thus there will be a complete back and forth or reciprocable movement of the piston 2. When the piston of the servomotor passes through a reciprocable movement, it will remain at the bottom of its cylinder during a subsequent depressing of the pedal P. This subsequent depressing of the pedal, however, will disconnect the diaphragm motor D from the tank T and connect it with atmosphere. As a result, spring 91 with the aid of spring 79 will again function to shift the reversing valve element to its upper position, thereby resetting the valve for another reciprocation of the piston of the servomotor. As long as the pedal remains released after a piston movement or is again depressed, there will be no movement of the piston of the servomotor. However, when the pedal is released after a depressing movement there will then occur another complete reciprocation of the piston of the servomotor and the cycle of operations of the reversing valve means will occur in a manner already described. The reciprocation of the piston of the servomotor will always occur whenever the secondary circuit is energized and the pedal P is depressed and then released.

Under conditions wherein spring 17' is eliminated, the piston of the servomotor will be at the upper end of its cylinder when the primary circuit is broken and the secondary circuit is closed by the speed-responsive device S. Also under such conditions the reversing valve element 65 will still be held in its lower position as shown in Figure 7. The valve element 119 of the shut-off valve SV will be in its open position and thus there will be a fluid connection with the lower end of the servomotor. The reason that the valve element of the shut-off valve SV is open is because prior to the release of the pedal P the upward movement of the plunger 88 under the action of the spring 91 of the diaphragm motor D had caused an opening of the valve element under the camming action of the angular surface 124, it being noted that the valve element could no longer be maintained closed because the solenoid 23 became de-energized and remained de-energized upon the opening of the primary circuit. Thus if there should be a release of the pedal P under the conditions set forth, a differential fluid pressure will be caused to act downward upon the piston 2 of the servomotor and said piston will be moved from its upper end to its lower end where it will remain until the pedal is again depressed and released.

With the piston of the servomotor now at the lower end of its cylinder and the secondary circuit still energized, the piston and the reversing valve means will be in such a condition that depressing and releasing of the pedal P will result in a complete back and forth movement or reciprocation of the servo-piston 2 in a manner which has already been described. When the pedal P is depressed after the piston has reached the bottom of the cylinder, there will first occur a resetting of the reversing valve element 65. This is brought about by the connecting of the diaphragm motor D to atmosphere as the pedal is depressed and the valve DV moved to its right hand position as shown in Figure 8. The spring 91 is now free to expand and the plunger 88 will be moved upwardly, opening the master switch M and thereby de-energizing the solenoid 24 and closing the control valve CV. The continued upward movement of the plunger 88 will then result in the reversing valve element 65 assuming its upper position. With the reversing valve element 65 reset it is then obvious that when the pedal is released the servomotor will be operated and the piston thereof will move from the bottom position to its upper position, wherein the arm 9 will again cause the reversing valve element 65 to move to its lower position and thus reverse the fluid connections of the servomotor with the tank T and atmosphere. As a result of this reversal, the piston 2 will be moved by differential fluid pressure to its bottom position, thereby completing the reciprocative movement.

It is seen from the foregoing description of the operation of my novel reversing valve means and control means that upon closing of the secondary circuit, the piston of the servomotor can be caused to have a back and forth movement upon each depressing and releasing of the pedal P. If the spring 17' or its equivalent should be effective on the piston and the secondary circuit is closed, then as the pedal P is depressed the piston will be moved to the bottom of its cylinder under the action of the spring 17' and the reversing valve element will be reset so that the release of the pedal will result in a reciprocation of the piston of the servomotor. Under conditions wherein the spring 17' or its equivalent is not effective on the piston, then the piston will be at the upper end of the cylinder when the pedal P is depressed after initial closing of the secondary circuit. The releasing of the pedal under these conditions will not result in the reciprocation of the piston as there has not been any resetting of the reversing valve element; that is, a movement from its lower position to its upper position, because such resetting is prevented by the position of the servo-piston at the upper end of its cylinder. A release of the pedal, however, will result in the tank T being connected to the lower end of the cylinder of the servomotor and thus cause the piston to move to the bottom position. When this condition exists, then there will be a resetting of the reversing valve element by depressing pedal P so that the reciprocation of the piston can take place upon the next release of the pedal P. It is, therefore, seen that with the spring 17' eliminated there must first be a depressing and releasing of the pedal P before the control mechanism is conditioned so that each subsequent depressing and releasing of the pedal brings about the reciprocation of the piston of the servomotor.

If the speed-responsive device S should again return to rest or to such a condition wherein the primary contact is connected to ground and the pedal should be placed or already is placed in released condition, then the cycle of reciprocation will be broken. What will occur, however, will be the movement of the piston 2 of the sercomotor from its bottom position to its upper position in the cylinder. The closing of the primary circuit with the pedal released will result in both solenoids 23 and 24 being energized in the manner already described. The energization of the solenoid 23 will therefore close the shut-off valve SV, thereby preventing the tank T from being connected to the lower end of the cylinder of the servomotor. When the piston of the servomotor reaches its upper position it will remain there as long as the pedal is not depressed. If the spring 17' or equivalent is to be effective and there is provided some type of holding means therefor, the piston cannot return. If the spring 17' is not present, then the closed condition of the shut-off valve SV will insure that the piston will remain at its upper position, notwithstanding the reversing valve element is shifted to its lower position. Of course if no holding means is provided for the spring 17', then even with the pedal released the piston will return to the bottom of the cylinder under the action of the spring as both ends of the servo-cylinder will be connected to atmosphere. If holding means is provided for the spring 17', then of course the piston can be actuated to return to the bottom of the cylinder by depressing the pedal P. If the secondary circuit is again closed, then the reciprocation of the piston can again be brought about in a manner already described in detail.

From the foregoing description of the operation of the control system embodying the reversing valve means RV, it is seen that there is provided a control means for a servomotor by which the piston thereof can be caused to move from one end of its cylinder to the other end and remain in such position and upon the occurring of other conditions, which include the closing of the secondary circuit, the piston of the servomotor can be caused to have a complete reciprocation; that is, a movement from one end of the cylinder to the other end and an automatic return movement, all under the action of differential fluid pressure.

It is also seen from the foregoing description that the control system embodying the reversing valve means RV is very well adapted for controlling the changing of gear ratios of a change-speed transmission of a vehicle. The servomotor can be employed to disengage the vehicle friction clutch and it can also be employed to accomplish the changing of gear ratios. For example, the upward movement of the piston can accomplish the disengagement of the friction clutch and the downward movement of the piston can be employed to accomplish the shifting of the transmission elements to establish the different speed drives. When employed to both disengage a friction clutch and change the gear ratio or drive of a transmission, the re-engaging movement of the clutch can be slowed down by any suitable retarding means so that the shifting of the transmission can be accomplished by the fast downward movement of the piston before there is any actual friction clutch re-engagement. One example of a particular use of the control system embodying the reversing valve means RV would be in the operating of a pre-selective gear shifting mechanism such as that disclosed in my U. S. Patent No. 2,126,032, issued August 9, 1938, for "Motor Vehicle Transmission Control." In such a pre-selective control mechanism, neutralization of an active gear ratio is accomplished by a movement of a reciprocal member in one direction and establishment of a pre-selected gear ratio is accomplished by the return movement of said member. Thus it is obvious that the servo-piston 2 controlled by the reversing valve means RV and its control means could be employed to do the neutralizing of an active gear ratio and the establishing of a pre-selected gear ratio when reciprocal movement takes place. The engine friction clutch could also be disengaged and controlled to re-engage during the reciprocable movement of the piston 2 if such were desired.

In Figure 11 there is disclosed a slightly modified means for resetting the reversing valve element of the reversing valve means RV, the modified structure disclosing means for causing the resetting to be accomplished directly by manual force through the pedal P. The modified reversing valve means is indicated by the letters RV' and the structure shown differs from the previously described structure primarily in the elimination of the diaphragm motor D and its control valve CV. All the structure of the reversing valve means RV' and the shut-off valve SV', which is identical to that already described, is indicated by like reference numerals. The plunger 88 is replaced by a plunger 88'. The lower end of this plunger is arranged to be operated by an arm 110' pivoted on a pin 127. Also pivoted on this pin is an arm 111' to which the rod 112 actuated by the pedal P is operably connected. The arms 110' and 111' are operatively connected together by a torsional spring 128 which is of sufficient strength to cause a movement of the two arms in unison when the pedal is depressed to thereby move the plunger 88' upwardly and thus cause a resetting of the reversing valve element. The upward movement of plunger 88' also will open the shut-off valve SV by the cam surface 124' as shown in Figure 11. When the plunger 88' is moved upwardly to the limit of its movement, the spring 128 can yield to accommodate additional movement of the pedal P as desired. When the pedal P is fully released the plunger 88' will be released to return to its lower position which will close the master switch M in the same manner that the master switch M was closed by the operation of the diaphragm motor D in the previously described reversing valve means RV. The operation of the modified reversing valve means RV' with the direct mechanical linkage means for manually resetting the valve is identically the same as the operation of the reversing valve means RV already described in detail. Each time that the pedal is depressed the plunger 88' will be moved upwardly to reset the reversing valve element if such is conditioned to be reset by the position of the piston of the servomotor F.

Having now illustrated and described different embodiments of my invention, I desire it to be understood that my invention is not to be limited, in the broader aspects thereof, to the specific forms, combinations and arrangements of structure herein shown and described for illustrative purposes, except in so far as such limitations are specified in the appended claims.

I claim as my invention:

1. In combination with a fluid servomotor having a reciprocable element and a source of fluid pressure therefor different from atmosphere, a reversing valve means comprising a valve element movable to two operative positions for alternately connecting the source with opposite sides of the motor reciprocable element, means for placing said valve element in one of its operative positions to connect one side of the motor element to the source and thereby cause said motor element to move from a first position to a second position, means operable by the motor element when in the second position for placing said valve element in its other operative position to thereby connect the other side of the motor with the source and cause the motor element to return to its said first position, a reciprocable member for resetting the valve element, manually-controlled means for causing the member to reset the valve element, a control valve means between the source and the reversing valve means, electrical means including an electrical circuit for controlling the control valve, and means operable by the movement of the reciprocable member when resetting the valve element for controlling the electrical circuit to cause closing of the control valve means.

2. In combination with a fluid servomotor having a reciprocable element and a source of fluid pressure therefor different from atmosphere, a reversing valve means comprising a valve element movable to two operative positions for alternately connecting the source with opposite sides of the motor reciprocable element, means for placing said valve element in one of its operative positions to connect one side of the motor element to the source and thereby cause said motor element to move from a first position to a second position, means operable by the motor element when in the second position for placing said valve element in its other operative position to thereby connect the other side of the motor with the source and cause the motor element to return to its said first position, a reciprocable member for resetting the valve element, manually-controlled means for causing the member to reset the valve element, a control valve means between the source and the reversing valve means, a solenoid energizable for opening the control valve, an electrical circuit including a source of electrical energy and a switch for the solenoid, and means operable by the movement of the reciprocable member when resetting the valve element for opening the switch to de-energize the solenoid and thus close the control valve means.

3. In combination with a fluid servomotor having a reciprocable element and a source of fluid pressure therefor different from atmosphere, a reversing valve means comprising a valve element movable to two operative positions for alternately connecting the source with opposite sides of the motor reciprocable element, means for placing said valve element in one of the operative positions to connect one side of the motor element to the source and thereby cause said motor element to move from a first position to a second position, means operable by the motor element when in the second position for placing said valve element in its other operative position to thereby connect the other side of the motor with the source and cause the motor element to return to its first position, means for resetting said valve element in its first position, valve means for cutting off communication of the source with the reversing valve means, a solenoid for maintaining the last-named valve means open, an electrical circuit for the solenoid including a speed-responsively controlled switch and a second switch, and means operable by the resetting means for opening the second switch.

4. In combination with a fluid servomotor having a reciprocable element and a source of fluid pressure therefor different from atmosphere, reversing valve means interposed between said source and said motor and controllable by the reciprocable element for movement to a plurality of operative positions, the valve means connecting the source with the motor so that the reciprocable element will be caused to move from a first position to a second position and to have a return movement to its said first position, said valve means being conditioned by movement of said reciprocable element to one of the operative positions, and combined speed-responsively controlled means and personally-operable means interposed between said source and said reversing valve means for overruling said valve means, thereby causing the motor element to remain at its said second position despite the conditioning of the reversing valve means under the control of the reciprocable element to normally cause the motor element to be returned to the first of its said positions.

5. In combination with a fluid servomotor having a reciprocable element and a source of fluid pressure therefor different from atmosphere, reversing valve means interposed between the source and the motor, means including the reversing valve means for connecting the source with the motor to cause movement of the reciprocable element from a first position to a second position, means for operating the reversing valve element by the reciprocable element when said element assumes its said second position, said last-mentioned means being effective to condition said reversing valve to connect said motor to the source for causing the reciprocable element to return to its first position, a personally-operable member, additional valve means controlled by the personally-operable member and operatively interposed between said reversing valve means and said source for controlling the connection of the reversing valve means with the source, and means including means also controlled by the personally-operable member and interposed between the reversing valve means and the motor for causing the motor element to remain at the second position despite the conditioning of the reversing valve means by the motor element to cause the motor element to be returned to its first position.

6. In combination with a fluid servomotor having a reciprocable element and a source of fluid pressure therefor different from atmosphere, a reversing valve means comprising a valve element movable to first and second operative positions for alternately connecting the source with opposite sides of the movable element of the motor, means for placing said valve element in its first position to connect one side of the movable element with the source causing the element to move from a first position to a second position, means controlled by the fluid motor element when in its second position for placing the valve element in a position to accommodate connection of the other side of the motor element to the source, a shut-off valve element between the reversing valve element and the said other side of the motor element, speed-responsively controlled means for causing the said shut-off valve element to selectively assume a closed position and an open position, and other personally-operable power means for opening said shut-off valve element.

7. In combination with a fluid servomotor having a reciprocable element and a source of fluid pressure therefor different from atmosphere, reversing valve means operatively interposed between the source and the motor and controllable by the reciprocable element for movement to first and second operative positions to connect the source with the motor for causing movement of the reciprocable element from a first position to a second position and through a return movement to the first position, shut-off valve means between the reversing valve means and the motor, said shut-off valve means when closed preventing connection of the source with the motor for causing movement of the motor element to the second position, a speed-responsive device operable to a first controlling position to cause closure of the shut-off valve means and to a second controlling position to accommodate opening of the shut-off valve means, and personally-operable means for opening the shut-off valve means when the speed-responsive device is in said second position.

8. In combination with a fluid servomotor having a reciprocable element and a source of fluid pressure therefor different from atmosphere, reversing valve means comprising a valve element for alternately connecting the source with opposite sides of the movable element of the motor, means for actuating said valve element to connect one side of the movable element with the source causing the element to move from a first position to a second position, means controlled by the element when in its second position for actuating the valve element to connect the other side of the motor element to the source, a shut-off valve element between the reversing valve element and the said other side of the motor element, a speed-responsive device, a solenoid energizable for causing said shut-off valve element to be closed, an electrical circuit for the solenoid, a switch in the circuit, and means for closing and opening the switch by operation of the speed-responsive device.

9. In combination with the accelerator pedal of an engine and a fluid servomotor having a reciprocable element and a source of fluid pressure therefor different from atmosphere, reversing valve means operatively interposed between the source and the motor and movable to a first operative position and to a second operative position, means including the reversing valve means when in its first position for connecting the source with the motor to move the reciprocable element from a first position to a second position, the reversing valve means being actuatable to its second position for connecting the source with the motor to return the reciprocable element from its first position to its second position, means operatively connecting the reversing valve means to the reciprocable element, said reversing valve means being actuated to its second position when the reciprocable element assumes its second position for returning the reciprocable element to its first position, shut-off valve means operatively interposed between the reversing valve means and the motor for actuation to a closed position to prevent the motor element from being moved from its second position despite the conditioning of the reversing valve means to its second position by the motor element, speed-responsive means for selectively controlling the actuation of the shut-off valve means to its said closed position and to an opened position wherein return of the motor element is accommodated, and means controlled by the accelerator pedal for actuating the shut-off valve means to open position when such actuation is accommodated by the speed-responsive means.

10. In combination with a fluid servomotor having a reciprocable element and a source of fluid pressure therefor different from atmosphere, a reversing valve means comprising a valve element for selective actuation to a first position and to a second position for connecting the source to opposite sides of the movable element of the motor, means for placing said valve element in its first position to connect one side of the movable element with the source to move the element from one position to a second position, means controlled by the fluid motor element when in its second position to condition the valve element for connecting the other side of the motor element to the source, a shut-off valve element operatively interposed between the reversing valve element and the other side of the motor element, speed-responsively controlled means for selectively actuating said shut-off valve element to a first closed position for preventing connection of the other side of said other element to said source and to a second opened position at which such connection is accommodated, and personally-operable means for actuating the shut-off valve element to its open position and for resetting the reversing valve element to its first-named position.

11. In combination with a fluid servomotor having a reciprocable element and a source of fluid pressure therefor different from atmosphere, a reversing valve means comprising a valve element operable to two operative positions for selectively connecting the source with opposite sides of the movable element of the motor, means for placing said valve element in a first of its positions to connect one side of the movable element with the source for effecting movement of the element from a first position to a second position, means controlled by the fluid motor element when the same is in its second position for conditioning the valve element to normally connect the other side of the motor element to the source, shut-off valve means operatively interposed between the reversing valve element and said other side of the motor element, said shut-off valve means having an open position and a closed position at which closed position said source is prevented from communicating with said other side of the motor element while communication of said other side with atmosphere is accommodated, means for closing the shut-off valve means, spring means acting on said motor element to return it from its second position to its first position, and personally-operable means for actuating said shut-off valve means to open position and for resetting the valve element of the reversing valve means in its said first position wherein said valve element is effective to connect said first side of the fluid motor element to the source.

12. In combination with a fluid servomotor having a reciprocable element and a source of fluid pressure therefor different from atmosphere, a reversing valve means comprising a valve element operable to first and second operative positions for selectively connecting the source with opposite sides of the movable element of the motor, means for actuating said valve element to its first position to connect one side of the movable element with the source for causing the element to move from a first position to a second position, means controlled by the fluid motor element when in its second position for actuating the valve element to its second operative position to accommodate the connection of the other side of the motor element to the source, shut-off valve means operatively interposed between the reversing valve element and said other side of said motor element, said shut-off valve means being operable to an opened position and to a closed position at which closed position communication of the source with the said other side of the motor element is prevented and said other side is placed in communication with the atmosphere, spring means acting on the motor element to return it from its said second position to its said first position when the shut-off valve means is in closed position, speed-responsively controlled means for selectively actuating the shut-off valve means to either of its positions, and personally-operable means operable in cooperation with said speed-responsively controlled means for actuating the shut-off valve means to open position and for resetting the valve element of the reversing valve means to its first position.

13. In combination with a fluid servomotor having a reciprocable element and a source of fluid pressure therefor differing from atmosphere, a reversing valve means comprising a reciprocable valve element movable to first and second operative positions for selectively connecting the source with opposite sides of the movable element of the motor, means for yieldably holding the valve element in each of its two operative positions, means for moving the valve element from its first operative position to its second operative position by movement of the motor element as the motor element is actuated by fluid pressure from a first position to a second position, the movement of said valve element to its second position reversing the connections of the source with said motor and causing fluid pressure in said motor to move the motor element back to its first position, a plunger, a spring operatively interposed between one end of the plunger and the valve element, said end of the plunger being normally spaced from the valve element to accommodate compression of the spring as the valve element is moved to its said second operative position by the motor element and to prevent contact of the valve element and the plunger end, and personally operable means for moving the plunger toward the valve element to further compress the spring and then subsequently engage the valve element to free the valve element from the associated yieldable holding means, said valve element being then moved by the stored energy of the spring to its said first position.

14. In combination with a fluid servomotor having a reciprocable element capable of primary movement from a first position to a second position and return movement to said first position and a source of fluid pressure therefor different from atmosphere, a reversing valve means comprising a reciprocable valve element movable to alternate first and second operative positions for alternately connecting the source with opposite sides of the movable element of the motor, means for yieldably retaining the valve element in each of its two operative positions, means for moving the valve element from its first operative position to its second operative position as a consequence of primary movement of the motor element under the influence of fluid pressure in said motor, said valve element movement from its first to its second operative position reversing the connection of the source with the motor and causing said return movement of the motor element, a plunger, a spring operatively interposed between one end of the plunger and the valve element, said one end of the plunger being normally spaced from the valve element to accommodate compression of the spring as the valve element is moved to its said second operative position by the motor element and without contact of the valve element and the plunger end, means for moving the plunger toward the valve element to further compress the spring and then subsequently engage the valve element to free the valve element from the associated yieldable retaining means, said valve element then being moved by the stored energy of the spring to its said first operative position, a solenoid-controlled valve operatively interposed between the source and the reversing valve, an electrical circuit for the solenoid including a switch, the valve being open when the switch is closed and the solenoid energized, and means for opening the switch upon movement of the plunger toward the reversing valve element to further compress the spring and prior to the plunger engaging said valve element.

15. In combination with a fluid servomotor having a reciprocable element capable of primary movement from a first position to a second position and of return movement to said first position and a source of fluid pressure therefor different from atmosphere, reversing valve means interposed between the source and the motor for movement to a first motor operative position and to a second motor operative position, said reversing valve means being controllable by the reciprocable element for connecting the source with the motor to cause both primary and return movement of said reciprocable element, shut-off valve means operatively interposed between the reversing valve means and the motor, said shut-off valve means being actuatable to closed position for preventing the return movement of the motor element, control valve means operatively interposed between the source and the reversing valve means and actuatable to open position for establishing a communication therebetween, a speed-responsive device, personally-operable means, and means cooperatively controlled by the speed-responsive device and said personally-operable means for selectively causing actuation of said shut-off valve means and said control valve means to different operative positions including a first position in which the shut-off valve means is closed and the control valve means is open, and a second position at which only the control valve means is open.

16. In combination with a fluid servomotor having a reciprocable element capable of primary movement from a first position to a second position and of return movement to said first position and a source of fluid pressure different from atmosphere for actuating said fluid motor, reversing valve means interposed between said source and the motor for movement to a first operative position and to a second operative position, said reversing valve means being controllable by the reciprocable element for connecting the source with the motor to cause both primary and reverse movement of said reciprocable element, shut-off valve means operatively interposed between the reversing valve means of the motor, valve means being actuatable to a closed position for preventing the return movement of the motor element, control valve means operatively interposed between the source and the reversing valve means and actuatable to an opened position for establishing communication therebetween, a speed-responsive device, personally-operable means, solenoids for closing the shut-off valve means and opening the control valve means when energized, an electrical circuit including both solenoids, a second circuit including the solenoid for the control valve means, means actuated by the speed-responsive device for selectively closing said circuits, and switch means operable by the personally-operable means for closing and opening the circuits.

17. In combination with a fluid servomotor having a reciprocable element capable of primary movement from a first position to a second position and of return movement to said first position and a source of fluid pressure different from atmosphere for actuating said fluid motor, reversing valve means interposed between the source and the motor for movement to a first operative position and to a second operative position, said reversing valve means being controllable by the reciprocable element for connecting the source with the motor to cause both primary and reverse movement of said reciprocable element, shut-off valve means operatively interposed between the reversing valve means and the motor, said shut-off valve means being actuatable to closed position for preventing the return movement of the motor element, control valve means operatively interposed between the source and the reversing valve means and actuatable to opened position for establishing communication therebetween, a speed-responsive device, a personally-operable means, solenoids for closing the shut-off valve means and opening the control valve means when energized, an electrical circuit including both solenoids, a second circuit including the solenoid for the control valve means, means actuated by the speed-responsive device for selectively closing the circuits, switch means operable by the personally-operable means for closing and opening the circuits, and means also operable by the personally-operable means after said switch means has been actuated to opened position for resetting the reversing valve means following a reciprocable movement of the motor element through both its primary movement and return movement.

18. In combination with a fluid servomotor having a reciprocable element capable of primary movement from a first position to a second position and return movement to said first position and a source of fluid pressure different from atmosphere for actuating said fluid motor, a reversing valve means including a valve element having a first operative position and a second operative position for alternately connecting the source with opposite sides of the movable element of the motor, means controlled by the fluid motor element when the valve element is in its first operative position for causing primary motor element movement, said last-mentioned means actuating the valve element to its second operative position for causing reverse movement of the motor element, personally-operable means for re-setting the valve element to its first operative position to condition the valve for an ensuing primary movement of the motor element, and means for causing said motor element to have a reverse movement only after its initial primary movement despite the prior conditioning of the valve element to its first operative position by operation of the personally-operable means.

19. In combination with a fluid servomotor and a source of fluid pressure different from atmosphere for actuating said fluid motor, valve means having a first operative position and a second operative position for alternately connecting the source with opposite sides of the movable element of the motor, means controlled by the fluid motor element when the valve element is in its first operative position for causing primary movement of said reciprocable element, said last-mentioned means being operable to condition the valve means for causing return movement of the reciprocable element, pedally controlled means for causing the valve means to be conditioned for effecting a second reciprocation, and means including a shut-off valve interposed between said valve means and said motor and a speed-responsive device for controlling said shut-off valve for preventing a second primary movement of the motor element despite the conditioning of the valve means for such primary movement after the motor element has completed its reverse movement.

GLENN T. RANDOL.

REFERENCES CITED

The following references are of record in the file of this patent:

UNITED STATES PATENTS

| Number | Name | Date |
| --- | --- | --- |
| 203,801 | Waring | May 14, 1878 |
| 1,230,150 | Geraghty | June 19, 1917 |
| 1,620,527 | Emmet | Mar. 8, 1927 |
| 1,905,133 | Bishop | Apr. 25, 1933 |
| 1,931,452 | Wheeler | Oct. 17, 1933 |
| 1,994,835 | Sanford | Mar. 19, 1935 |
| 2,020,847 | Mitereff | Nov. 12, 1935 |
| 2,159,879 | Dewandre | May 23, 1939 |
| 2,161,150 | Flygare | June 6, 1939 |
| 2,227,657 | Linsley | Jan. 7, 1941 |
| 2,373,167 | Cherry | Apr. 10, 1945 |